A. WALLACE.
SPRING WHEEL.
APPLICATION FILED DEC. 11, 1919.

1,379,665.

Patented May 31, 1921.

Inventor
Amos Wallace
By Chandler & Chandler
Attorneys

UNITED STATES PATENT OFFICE.

AMOS WALLACE, OF PETOSKEY, MICHIGAN.

SPRING-WHEEL.

1,379,665.  Specification of Letters Patent.  Patented May 31, 1921.

Application filed December 11, 1919. Serial No. 344,009.

*To all whom it may concern:*

Be it known that I, AMOS WALLACE, a citizen of the United States, residing at Petoskey, in the county of Emmet, State of Michigan, have invented certain new and useful Improvements in Spring-Wheels; and I do hereby declare the following to be a full, clear, and exact description of the invention, such as will enable others skilled in the art to which it appertains to make and use the same.

This invention relates to new and useful improvements in wheels and particularly to spring wheels.

One object of the present invention is to provide a novel and improved spring wheel which is simple in construction, strong and durable in operation, and which is composed of few and simple parts.

Another object is to provide a novel and improved device of this character wherein the parts can be easily and quickly taken apart and put together.

Other objects and advantages will be apparent from the following description when taken in connection with the accompanying drawing.

Figure 1:
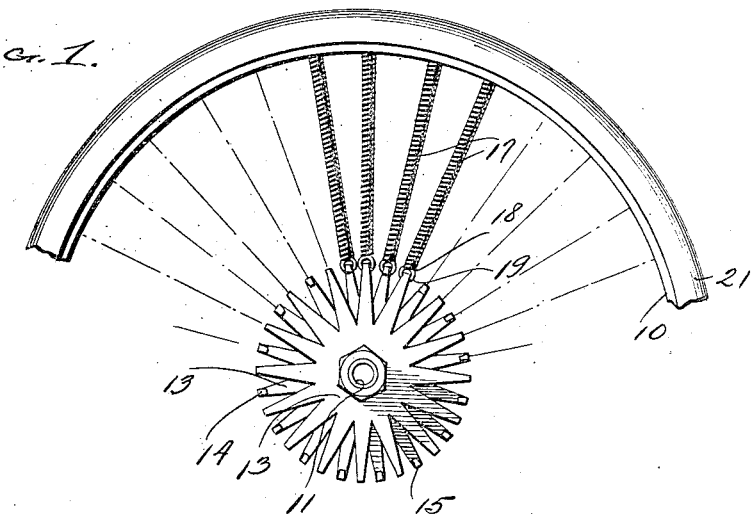
Figure 1 is a side elevation of a portion of a spring wheel made in accordance with the invention.
Figure 2:
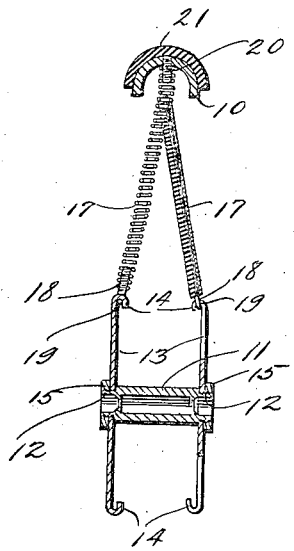
Fig. 2 is a vertical transverse sectional view through the rim, the hub, and one of the spokes.

Referring particularly to the accompanying drawing, 10 represents the rim of the wheel which is transversely concavo-convex with the convex face directed outwardly. Within the center of the wheel is disposed the hub 11 having its ends reduced and externally threaded at 12 for the engagement thereon of the star-shaped plates 13. The outer end of each of the points of the stars is bent into hook form as shown at 14. Nuts 15 are engaged on the reduced ends of the hub to retain the plates 13 thereon, and against the shoulders 16 formed on the hub.

Each of the spokes of the wheel consists of a strong coil spring extending from the hub to the rim, as shown at 17. In the inner end of each spoke is screwed a stem 18 having an eye 19 engaging with one of the hooks of the point of a star plate. In the other end of each spoke is screwed a threaded stem 20, the other end of said stem being screwed into the rim, as clearly seen in the drawing.

Detachably disposed on the outer face of the rim is a rubber or other tire 21 for the purpose of deadening the sound of the wheel when in motion on a road or street surface.

What is claimed is:

In a spring wheel the combination with a hub and rim, of a pair of plates secured to the ends of the hub and each having radiating points terminating in hooks, threaded stems engaged in the rim, threaded stems having eyes engaged with the hooks of the points, and coil spring spokes having the convolutions of their opposite ends threaded onto the said stems at the rim and at the hub.

In testimony whereof, I affix my signature, in the presence of two witnesses.

AMOS WALLACE.

Witnesses:
 VESTALL A. BAKER,
 WILLIAM R. MONTGOMERY.